United States Patent [19]

Takahashi et al.

[11] Patent Number: 4,823,461

[45] Date of Patent: Apr. 25, 1989

[54] METHOD OF MANUFACTURING FLUIDIC ANGULAR RATE SENSOR

[75] Inventors: Fumitaka Takahashi, Wako; Kunio Okazaki, Hatano; Masaru Shiraishi, Funabashi; Masayuki Takahashi, Hatano, all of Japan

[73] Assignees: Honda Motor Co., Ltd.; Stanley Electric Co., Ltd., both of Tokyo, Japan

[21] Appl. No.: 198,044

[22] Filed: May 24, 1988

[30] Foreign Application Priority Data

May 29, 1987 [JP] Japan ................................ 62-136016

[51] Int. Cl.$^4$ ............................................ H01C 17/28
[52] U.S. Cl. ........................................ 29/612; 29/621;
228/159; 445/32; 73/516 R; 73/516 LM;
338/322; 338/329; 174/94 R
[58] Field of Search .................. 29/612, 621; 228/159;
445/32; 73/516 R, 516 LM; 338/44, 322, 329;
174/94 R

[56] References Cited

U.S. PATENT DOCUMENTS

| | | | |
|---|---|---|---|
| 3,289,278 | 12/1966 | Gaia | 29/621 |
| 3,587,328 | 6/1971 | Schuemann | 73/516 |
| 3,628,371 | 12/1971 | Moore et al. | 73/516 |
| 3,851,291 | 11/1974 | Sommer | 29/621 |
| 4,020,699 | 5/1977 | Schaffer | 73/516 LM |
| 4,020,700 | 5/1977 | Lopiccolo et al. | 73/516 LM |
| 4,026,159 | 5/1977 | Isakson et al. | 73/516 LM |
| 4,714,815 | 12/1987 | Swarts et al. | 73/516 LM |

Primary Examiner—P. W. Echols
Attorney, Agent, or Firm—Frishauf, Holtz, Goodman & Woodward

[57] ABSTRACT

A method of manufacturing a fluidic angular rate sensor of the type wherein fine wires, such as tungsten wires, are mounted in tension over the heads of two pairs of spaced apart metal supports which are mounted on a ceramic disc having fluid passage apertures therein, comprising plating gold on the wires; fixedly mounting the wires between the spread apart metal supports by means of thermocompression bonding or the like; and heating the mounted gold plated wires in a predetermined atmosphere for removing the plated gold from the wires and to recrystallize the wires.

17 Claims, 2 Drawing Sheets

METHOD OF MANUFACTURING FLUIDIC ANGULAR RATE SENSOR

BACKGROUND OF THE INVENTION (a) Field of the Invention

The present invention relates to a fluidic angular rate sensor to be mounted on a moving object such as an automobile, an airplane or the like to detect its location by measuring an angular rate, without using an auxiliary signal sent from an external apparatus, e.g., radio waves sent from a stationary satellite.

(b) Description of the Related Art

The structure of a sensor element 1 which constitutes the main part of a known fluidic angular rate sensor is shown in FIG. 6. According to the conventional manufacturing method, two pairs of metal supports 13 are mounted on a ceramic disc 12 which has fluid passage apertures 12a. Fine tungsten or molybdenum wires 14 are mounted in tension over the respective metal supports 13. In this case, very fine wires are used to obtain a high sensitivity and to detect a small angular rate. Such very fine wires cannot be bonded to the metal supports by means of, e.g., spot welding. Instead, ultrasonic bonding has been used wherein as shown in FIG. 7 a gold layer 14a is metal-plated on the wires 14 and on the heads of the metal supports 13 to allow tight contact therebetween, and thereafter gold balls 15 are used to ultrasonically bond the tensed wires 14 to the metal supports 13.

The operating principle of the fluidic angular rate sensor having the sensor element 1 as described above is illustrated in FIG. 8. Specifically, the sensor 1 is mounted on a vehicle or the like and is adjusted such that the wires 14 of the sensor are aligned perpendicular to the plane of angular rate sensitivity. A helium gas H is jetted out from a nozzle N. In this condition, if there is no angular rate, the helium gas H goes straight ahead and equally contacts the two wires 14 to maintain the same temperature condition and hence the same resistance value of the two wires 14. If there exists an angular change rate, the helium gas H is biased to one direction (as shown in FIG. 8) so that one of the wires 14 is cooled more than the other to cause a temperature difference and hence a difference in resistance between wires 14. The angular change rate is measured based on this resistance difference.

The sensitive sensor 1 made by the above-described conventional manufacturing method, however, has the following problems.

First, since gold 14a is metal-plated on the wires 14, a relatively large resistance temperature coefficient of, e.g., tungsten becomes lower, resulting in a degraded sensitivity. The resultant temperature coefficient is dependent upon the thickness of the plated gold 14a. Therefore, the temperature coefficient may vary with a manufacture lot so that a correct measurement of angular rate is not possible without adjusting the temperature coefficient of each lot. Second, since the wires 14 are mounted on the metal supports in tension, this tension remains as residual stresses which become a cause of age variations in resistance values of the wires 14. Thus, a long term stable measurement of angular rate becomes impossible, thus requiring frequent maintenance. The residual stresses are present also in the plated gold 14a so that the age variations become more complicated to the degree that the variations cannot be compensated in practice.

In addition to the above problems, the wires, e.g., tungsten wires, made only by a wiredraw process have a fiber-type structure. Therefore, by supplying electric power to a mounted sensor, the wires are heated to undergo re-crystalization which causes variations in resistance.

SUMMARY OF THE INVENTION

To solve the above problems, the present invention provides a method of manufacturing a fluidic angular rate sensor of the type wherein fine wires such as tungsten wires are mounted in tension on the heads of two pairs of metal supports which are mounted on a ceramic disc having fluid passage apertures, comprising the steps of:

plating a gold layer on said wires and fixedly spreading said wires over said metal supports by means of thermocompression bonding or the like; and heating said wires in a predetermined atmosphere for removing said plated gold from said wires and for crystallizing said wires.

The foregoing and other objects, features and advantages of the present invention will become more apparent from the following detailed description of preferred embodiments thereof, as illustrated in the accompanying drawings.

DESCRIPTION OF THE PREFERRED EMBODIMENTS

Figure 1:
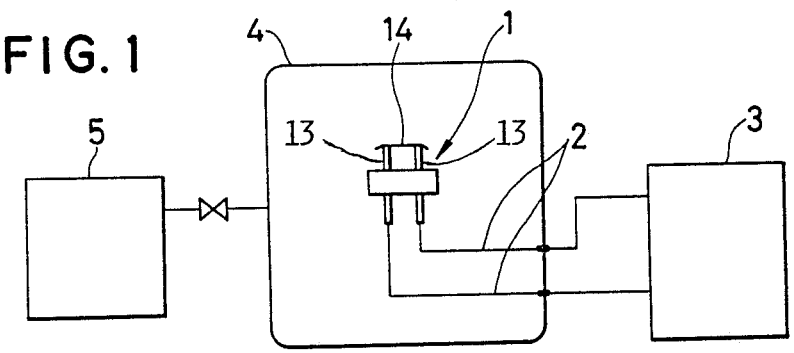
FIG. 1 is a schematic view showing the heating process used in an embodiment of a method of manufacturing a fluidic angular rate sensor according to the present invention.

The present invention will now be described in detail with reference to the accompanying drawings. To understand the invention easily, elements identical to those conventional ones are designated by using the same reference numerals, and the descriptions thereof are one is partially omitted.

Referring to FIG. 1, a sensor element generally designated by reference numeral 1 is formed using a method similar to a conventional in. The sensor element 1 is mounted on a chamber 4 and sealed therein with the wires 14 being connected to a power supply 3 via leads 2 and supports 13. An air exhaust device 5 coupled to the chamber 4 is then operated to exhaust air from the chamber 4 and attain a high vacuum smaller than 1.5 pascal. Next, the power supply 3 is turned on to supply electric power to the wires 14 to heat the wires 14. This heating process continues for a time sufficient to heat the plated gold 14a on the wires 14 to a temperature allowing the plated gold 14a to be evaporated and removed from the wires 14. With the heating process, the plated gold 14a is removed and the underlying material forming the wires 14 is completely exposed.

Figure 2:
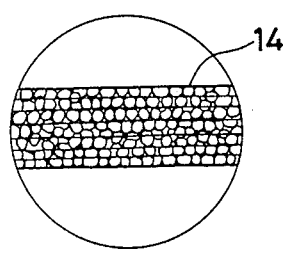
FIG. 2 is an enlarged view showing the structure of a wire prior to undergoing the heating process.
Figure 3:
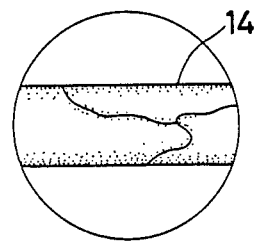
FIG. 3 is an enlarged view showing the structure of the wire after undergoing the heating process.

The power supply 3 is controlled such that the temperature of the wires 14, e.g., tungsten wires, becomes greater than 1500° C. to carry out a secondary re-crystallization of tungsten. FIG. 2 is a flying spot electron micrograph showing the tungsten wire 14 prior to undergoing the heating process. As seen from FIG. 2, the structure of the wire presents a fiber state such as that of bamboo fibers. The structure of the wire after the heating process presents re-crystallization as shown in FIG. 3 and is converted into a more stable state.

Figure 4:
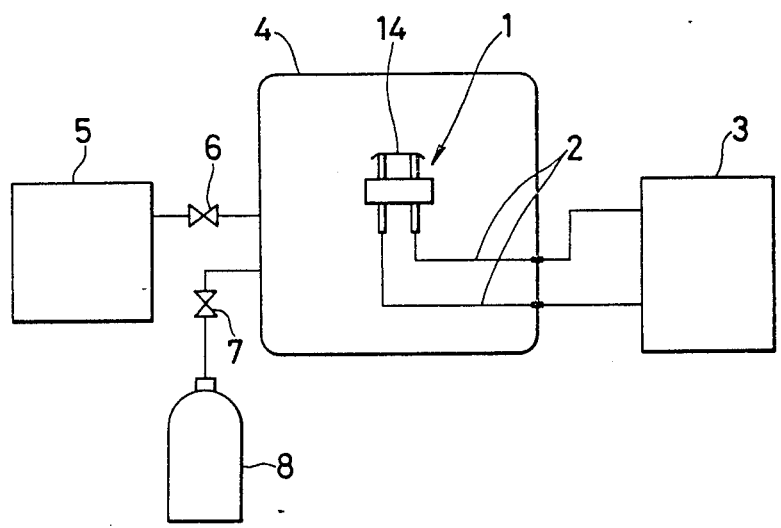
FIG. 4 is a schematic view showing the heating process of second and third embodiments of the method according to the present invention.

FIG. 4 illustrates the second embodiment of the method of manufacturing a fluidic angular rate sensor according to the present invention. Connected to the chamber 4 are an air exhaust device 5 and a gas cylinder 8 containing inert gas such as nitrogen gas. The air exaust device 5 and the gas cylinder 8 can be operated interchangeably by respective stop valves 6 and 7. A sensor element 1 is mounted in the chamber 4 and sealed therein. Thereafter, the stop valve 6 of the air exhaust device 5 is released (i.e., opened) to start operating the device and exhaust air. After closing the stop valve 6, the stop valve 7 of the gas cylinder 8 is released (i.e., opened) to fill inert gas in the chamber. As the pressure of the inert gas becomes high, the evaporation temperature of the plated gold 14a (melting point of gold is about 1070° C. at atmospheric pressure) will also rise, thus requiring a higher temperature during the heating process. Consequently, the pressure of the inert gas is preferably maintained lower than that of the atmospheric pressure.

Then, the wires 14 are subjected to a heating process similar to that of the first embodiment by supplying electric power to the wires 14 from the power supply 3.

In the third embodiment which is not shown because the embodiment configuration is the same as FIG. 4, reductive gas such as hydrogen is used in the gas cylinder 8. After a heating process similar that of to the second embodiment the same advantageous effects was obtained. Further, a mixture of inert gas and reductive gas may be used, which also showed the same effects.

Figure 5:
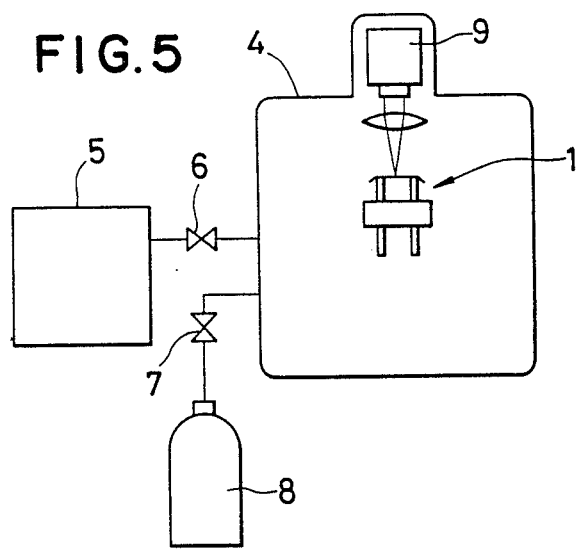
FIG. 5 is a schematic view showing the heating process of a fourth embodiment of the method according to the present invention.
Figure 6:
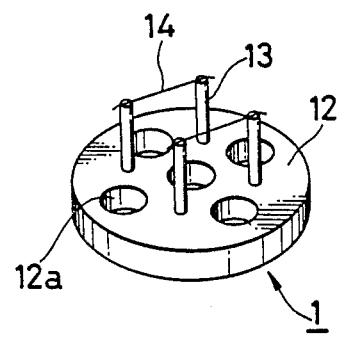
FIG. 6 is a perspective view showing a sensor element constituting the main part of a conventional fluidic angular rate sensor.
Figure 7:
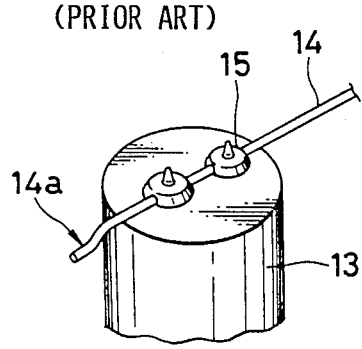
FIG. 7 is a perspective enlarged view showing the details of the conventional sensor element.
Figure 8:
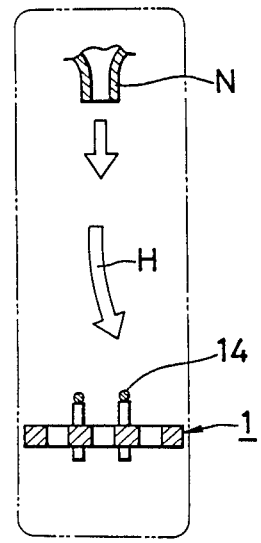
FIG. 8 illustrates the operating principle of a fluidic angular rate sensor.

Referring to FIG. 5 which illustrates a further embodiment of this invention, instead of the power supply 3, a laser beam device 9 is used. The heating process for the wires 14 is conducted using laser beams generated by the laser beam device 9. In this case, the heating process can be carried out under relatively uniform conditions, without considering variations in diameter of the wire with plated gold which cause variations in generated temperature, a change in resistance value which occurs as the plated gold 14a is evaporated gradually, or the like.

In the above embodiments, it is apparent that the wires 14 are subjected to re-crystallization so that residual stresses at the tensed wires 14 over the metal supports 13 are lightened and that the plated gold 14a are removed.

The sensor element 1 thus formed is mounted on a case and assembled into a fluidic angular rate sensor as in a conventional manner.

As appreciated from the foregoing description of this invention, after the wires are mounted in tension between posts, the plated gold thereon is evaporated and removed therefrom. In addition, the heating process for the wires, e.g. tungsten wires, is conducted at a temperature such that the underlying wire material can undergo recrystallization. Therefore, the temperature coefficient becomes near that of, e.g., tungsten, because of removal of the plated gold, thus resulting in high sensitivity. Further, the stresses caused by the tension of the wires are lightened. Therefore, age variations of the resistance of the wire are eliminated so that long term stable angular rate measurement is possible without adjustments and with simple maintenance. Furthermore, tungsten wires, for example, made only by a wiredraw process have a structure of fiber state. Therefore, by supplying electric power to a mounted sensor, the wires are heated to undergo recrystallization which is a more stable state, thereby reducing variations in resistance due to aging. The present invention has thus practically eliminated the above described age variations of the prior art devices. With the above advantageous effects, the practical utilization of the fluidic angular rate sensor is enhanced.

What is claimed is:

1. A method of manufacturing a fluidic angular rate sensor of the type wherein fine wires are mounted in tension over the ends of two pairs of of spaced apart metal supports which are mounted on a ceramic disc having fluid passage apertures therein, comprising the steps of:

plating a gold layer on said wires;

fixedly mounting said gold plated wires to said spaced apart metal supports such that said gold plated wires are in tension between respective pairs of said metal supports; and heating said mounted gold plated wires in a predetermined atmosphere for removing said plated gold from said wires and to cause said wires to be crystallized.

2. The method of claim 1, wherein said heating step comprises passing electric power through said wires to internally heat said wires.

3. The method of claim 2, wherein said predetermined atmosphere is a vacuum.

4. The method of claim 2, wherein said predetermined atmosphere comprises an inert gas at a pressure no greater than atmospheric pressure.

5. The method of claim 2, wherein said predetermined atmosphere comprises a reductive gas at a pressure no greater than atmospheric pressure.

6. The method of claim 2, wherein said predetermined atmosphere comprises a gas mixture of inert gas and reductive gas at a pressure no greater than atmospheric.

7. The method of claim 1, wherein said heating step comprises radiating laser beams on said wires to externally heat said wires.

8. The method of claim 7, wherein said predetermined atmosphere is a vacuum.

9. The method of claim 7, wherein said predetermined atmosphere comprises an inert gas at a pressure no greater than atmospheric pressure.

10. The method of claim 7, wherein said predetermined atmosphere comprises a reductive gas at a pressure no greater than atmospheric pressure.

11. The method of claim 7, wherein said predetermined atmosphere comprises a gas mixture of inert gas and reductive gas at a pressure no greater than atmospheric.

12. The method of claim 1, wherein said predetermined atmosphere is a vacuum.

13. The method of claim 1, wherein said predetermined atmosphere comprises an inert gas at a pressure no greater than atmospheric pressure.

14. The method of claim 1, wherein said predetermined atmosphere comprises a reductive gas at a pressure no greater than atmospheric pressure.

15. The method of claim 1, wherein said predetermined atmosphere comprises a gas mixture of inert gas and reductive gas at a pressure no greater than atmospheric.

16. The method of claim 1, wherein said mounting step comprises bonding said wires to said respective metal supports by thermocompression bonding.

17. The method of claim 1, wherein said sensor comprises two pairs of metal supports, the supports of each pair being spaced apart from each other, and said gold plated wires comprise two gold plated wires, each wire being mounted in tension between the spaced apart supports of a respective pair of supports, said wires being arranged substantially in parallel with each other.

* * * * *

UNITED STATES PATENT AND TRADEMARK OFFICE
CERTIFICATE OF CORRECTION

PATENT NO. : 4,823,461
DATED : April 25, 1989
INVENTOR(S) : TAKAHASHI et al

It is certified that error appears in the above-identified patent and that said Letters Patent is hereby corrected as shown below:

Column 2, line 60, "one is" should be deleted
           line 64, "on" should be -- in --
           lines 64-65, "4 and sealed therein with the wires 14 being connected" should read -- 4 and is sealed therein. Gold plated wires 14 are mounted on metal supports 13 and are connected --.

Column 2, line 63, "in" should read --one--

Signed and Sealed this

Third Day of July, 1990

*Attest:*

*Attesting Officer*

HARRY F. MANBECK, JR.

*Commissioner of Patents and Trademarks*